H. HANNEN.
Making White Lead.
No. 62,130.
Patented Feb. 19, 1867.
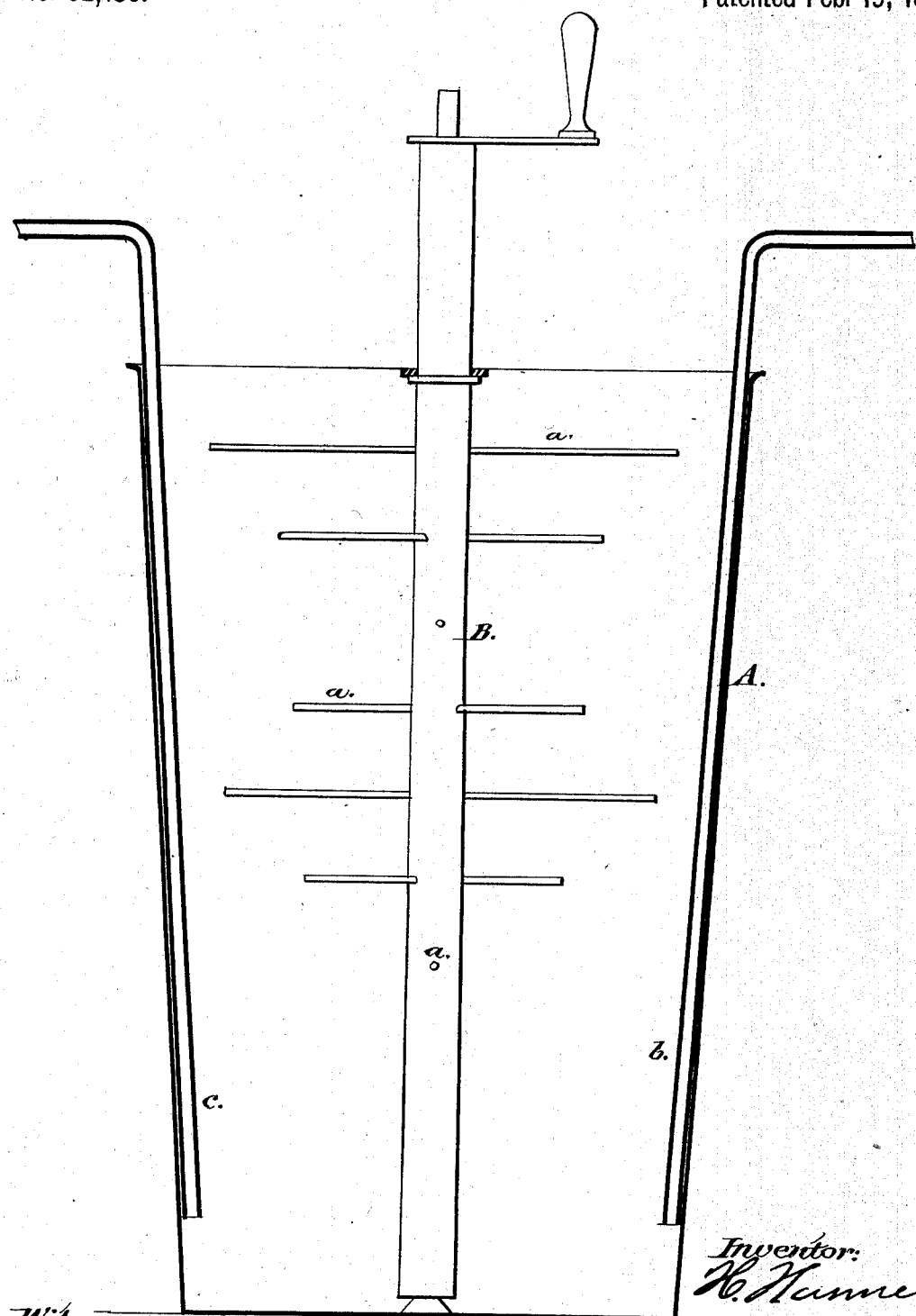

United States Patent Office.

HENRY HANNEN, OF PHILADELPHIA, PENNSYLVANIA, ASSIGNOR TO SAMUEL W. GREENE AND S. A. HANNEN, OF THE SAME PLACE.

Letters Patent No. 62,130, dated February 19, 1867.

IMPROVEMENT IN THE MANUFACTURE OF CARBONATE OF LEAD.

The Schedule referred to in these Letters Patent and making part of the same.

TO ALL WHOM IT MAY CONCERN:

Be it known that I, HENRY HANNEN, of Philadelphia, Pennsylvania, have invented a Mode of Manufacturing Carbonate of Lead; and I do hereby declare the following to be a full, clear, and exact description of my improved process, reference being had to the accompanying drawing, and to the letters of reference marked thereon.

My invention relates to the production of a pure carbonate of lead from what is generally termed white lead, and which contains portions of the oxide and acetate of lead, and sometimes particles of metallic lead; and my invention consists in subjecting a mass of the said white lead, mixed with water and heated, to the action of a volume of carbonic acid gas, in the manner fully described hereafter, whereby the whole of the said mass is converted into pure carbonate of lead. Ordinary white lead is produced by the action upon metallic lead of heat, moisture, the vapor of vinegar, and carbonic acid gas. In this process, however, the conditions are seldom so favorable that the entire mass of metallic lead is converted into a pure carbonate of lead, the resulting material, although mainly a carbonate, containing oxide and acetate of lead.

In order to reduce the material thus obtained to a pure carbonate of lead, I introduce the same into a vessel, A, and add water until the mass is in a pasty condition. A shaft, B, revolves in the vessel, and carries a number of arms or blades, $a$ $a$, the action of which maintains the mass at a uniform consistency. The material in the vessel is then washed several times in order to remove the superfluous portion of acetate of lead which may be mixed with the mass, and the latter is then heated to and maintained at a temperature of 130° Fahrenheit by means of a jet of steam introduced through a pipe, $b$, which extends nearly to the bottom of the vessel. When the entire mixture is at the proper temperature carbonic acid gas is forced through a pipe, $c$, into the mass of the material until the latter is converted into a pure carbonate of lead. The material is then removed and dried, when it will be ready for use.

Although I have illustrated and described certain apparatus for carrying out my improved process, I wish it to be understood that I do not confine myself to the use of apparatus of any particular description, but I claim as my invention, and desire to secure by Letters Patent—

The manufacture of a pure carbonate of lead by subjecting a mass of white lead, (containing the oxide or the acetate of lead,) mixed with water and heated, to the action of carbonic acid gas.

In testimony whereof I have signed my name to this specification in the presence of two subscribing witnesses.

HENRY HANNEN.

Witnesses:
 JOHN WHITE,
 CHARLES E. FOSTER.